March 11, 1930. N. W. COFFEY 1,749,936
AUTOMOBILE SIGNAL
Filed Nov. 11, 1924 3 Sheets-Sheet 1
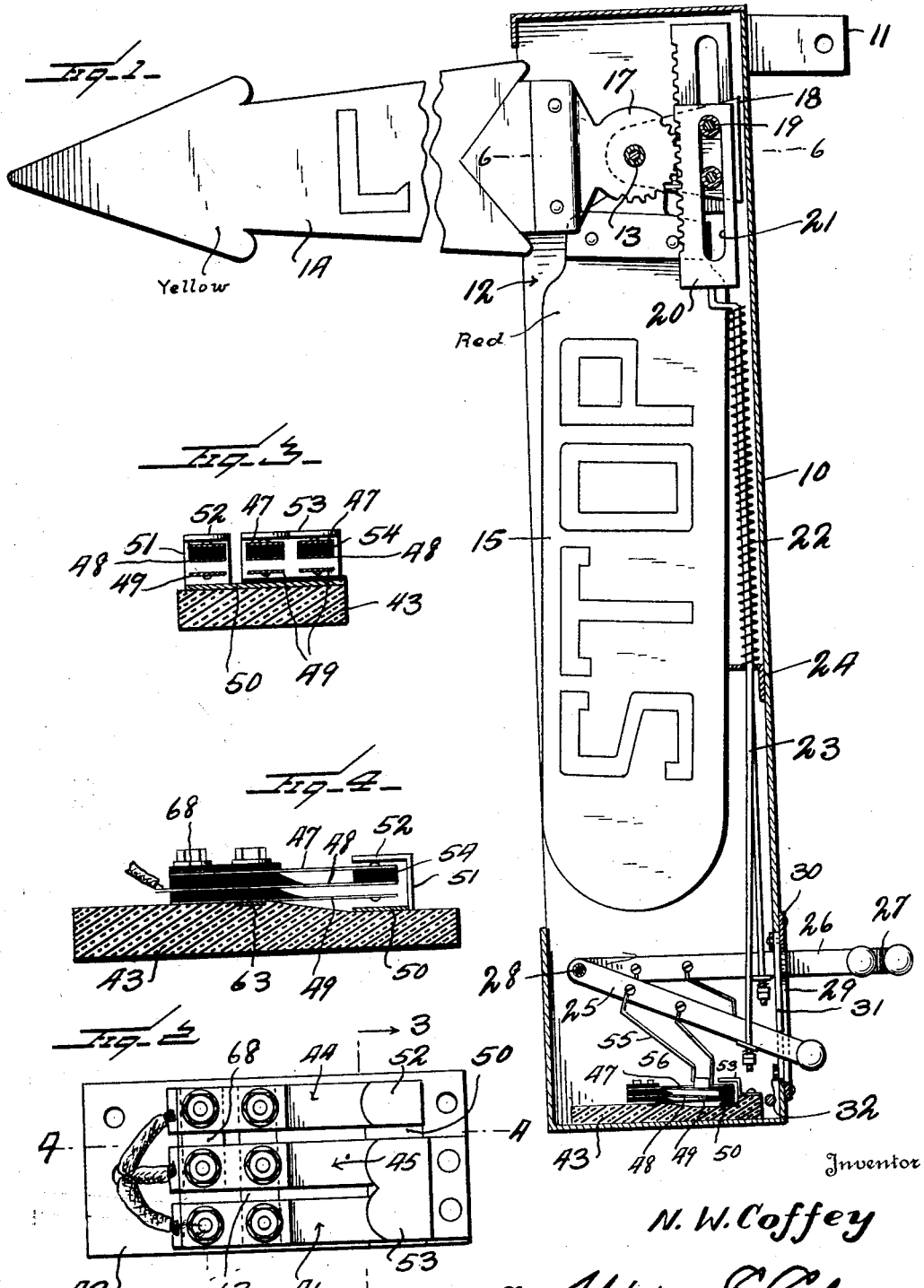

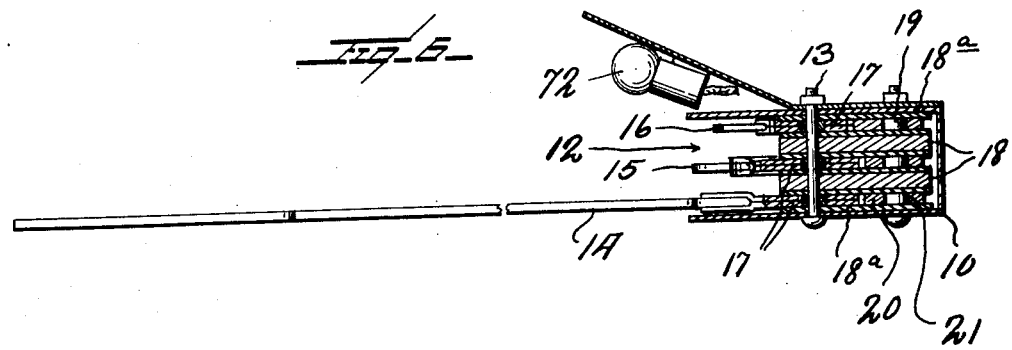
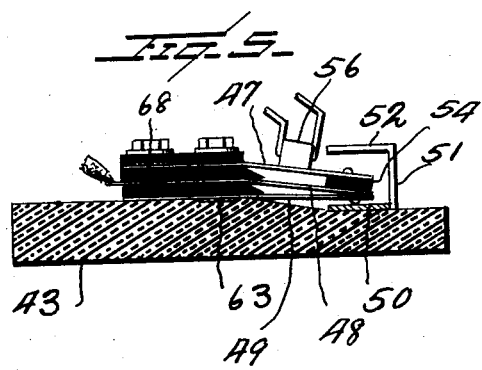
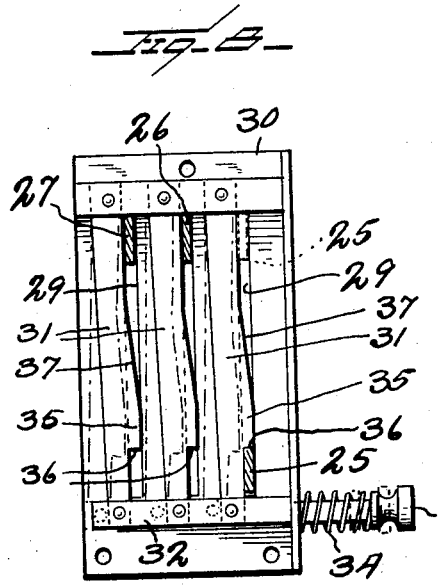
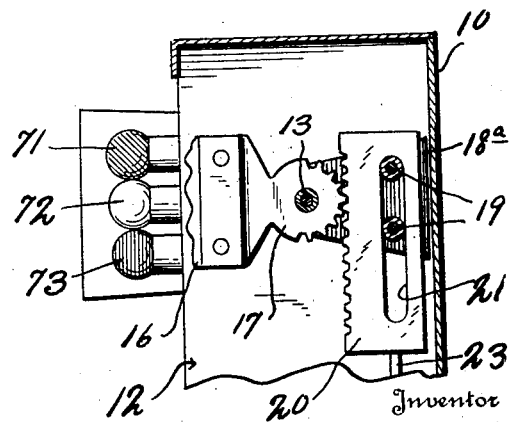

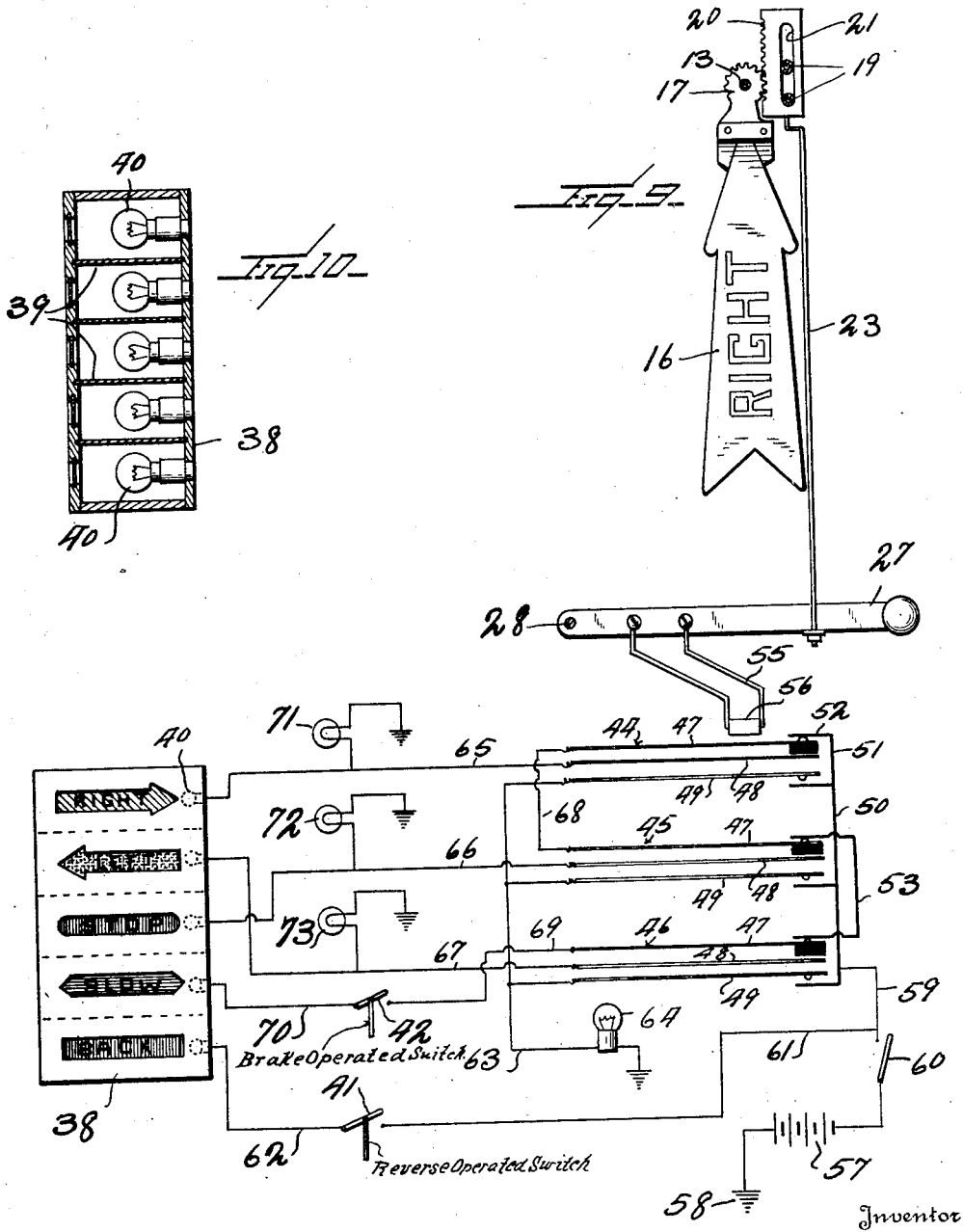

Patented Mar. 11, 1930

1,749,936

UNITED STATES PATENT OFFICE

NEWTON W. COFFEY, OF EL PASO, TEXAS

AUTOMOBILE SIGNAL

Application filed November 11, 1924. Serial No. 749,238.

This invention relates to automobile signals, and more particularly to a combined manually and electrically operated signalling system for automobiles.

An important object of the invention is to provide in a device of this character an electrical signalling mechanism including elements indicating intention of the operator to turn either to "right", "left", "stop", or to proceed at a "slow" pace, a mechanically operated signal giving all of these indications with the exception of the indication of the intention of the operator to proceed at a "slow" pace, this element of the electrical signal being controlled by the usual switch operated from the foot brake or clutch pedal, the operation of an element of the manually controlled switch bringing into operation a similar element of the electrically controlled switch.

A still further object of the invention is to provide in a device of this character a construction such that upon operation of any of the elements of the manually controlled signal and a corresponding operation of the similar element of the electrically controlled signal, the additional element or "slow" indication of the electrical signalling element is rendered inoperative, thereby preventing undue drain upon the source of current which in the signalling system of automobiles is usually the storage battery and, therefore, of very limited capacity.

A still further object of the invention is to provide a novel and improved form of switch for controlling corresponding elements of the electrically operated signal when an element of the mechanically operated switch is operated.

A still further object of the invention is to provide a novel and improved mechanically operated signalling element having means whereby upon operation of any signalling element it is held in operated position until released by the operator or until a second signalling element is operated when it is automatically released.

A still further object of the invention is to provide in a combination of the character above set forth means whereby the controls of the electrical signal are operated from the signalling operating element of the mechanically operated signal and whereby, since no two elements of the mechanically operated signal may be simultaneously operated, simultaneous operation of corresponding signals of the electrical signalling element is prevented.

These and other objects I attain by the construction shown in the accompanying drawings, wherein for the purpose of illustration is shown a preferred embodiment of my invention and wherein:

Figure 1 is a vertical sectional view through a signal constructed in accordance with my invention;

Figure 2 is a enlarged plan view of the switch employed;

Figure 3 is a section on the line 3—3 of Figure 2;

Figure 4 is a section on the line 4—4 of Figure 2;

Figure 5 is a section similar to that shown in Figure 4 and showing the switch in operation;

Figure 6 is a section on the line 6—6 of Figure 1;

Figure 7 is an enlarged detail sectional view of the upper end of the casing showing the arrangement of the lights carried by the signal casing;

Figure 8 is a rear elevation of the latching mechanism for the control arms showing the same in the locking position in full lines and in the releasing position in dotted lines;

Figure 9 is a diagrammatic view showing the connections employed;

Figure 10 is a vertical sectional view through the signal casing.

Referring now more particularly to the drawings, the numeral 10 indicates a casing adapted to be secured to a vehicle at one side thereof in any suitable manner as by brackets 11. The casing has the outer side thereof provided with an opening 12 extending from a point adjacent the top of the casing to a point adjacent the lower end thereof. Adjacent the upper end of the casing, a pivot 13 extends transversely of the casing upon which are rotatably mounted a plurality of signalling arms 14, 15 and 16 bearing respectively the legends "Left", "Stop", and "Right." Between the hub portions 17 of these signalling arms are disposed spacers 18, similar spacers 18a being arranged between the hubs of the outermost arms and the walls of the casing. Likewise directed through the casing, at the upper end thereof and adjacent the inner wall of the casing, are a pair of vertically spaced, horizontally extending guides 19 upon which are arranged spaced racks 20 having grooves 21 through which the guides 19 extend. The teeth of these racks engage with teeth formed upon the peripheries of the hubs 17, so that vertical movement of a rack causes rotation of its associated arm upon the pivot 13. When the rack is in elevated position and the lower end wall of the groove engaged against the lower guide 19, the associated arm is vertically disposed and concealed within the casing. When the rack is in lowered position, however, the associated arm is in horizontal position and projects from the casing.

The racks are normally held in elevated position by means of springs 22 which springs surround operating rods 23 connected with the racks and directed through openings formed in a guide 24 carried by the casing between such guide and the racks. The lower ends of these operating rods are connected with levers 25, 26 and 27 mounted upon a common pivot 28 extending transversely of the casing 10 adjacent the outer wall thereof. The lever 25 is connected with the rack of the arm 14, the lever 26 with the rack of the arm 15, and the lever 27 with the rack of the arm 16. These levers are of progressively increasing length, the lever 25 being the shorter, and have their inner ends directed through vertically extending slots 29 formed in the inner wall of the casing and preferably in a removable plate 30 closing an opening formed in this inner wall.

Pivoted to the plate 30, above the upper ends of the slots 29, are camming latch arms 31 corresponding in number and arrangement to the slots. The lower ends of these latch bars are pivotally connected to a common operating link 32 projecting through the side wall of the casing and having an operating knob 33, a spring 34 surrounding the link between the knob and the adjacent wall of the casing. These latch arms are each provided upon their side face with an outstanding lug 35 providing upon its lower face a shoulder 36 which in the normal position of the latch member, maintained by the link 32 and spring 34, extends transversely of the associated slot 29 just above the lower limit of movement of the lever operating in the slot. The upper surfaces of these lugs are inclined, as at 37, to provide cams over which the lever may move during their downward movement to displace the latch members against the action of the spring 34 to permit movement of the lever beneath the shoulder.

It will be obvious that all of these latch members, being pivotally connected to a common link, move in unison and accordingly downward movement of an operating lever 25, 26 or 27 will cause simultaneous movement of the latch members to a point where the lugs 35 thereof are cleared of the slots, so that a previously operated lever 25, 26 or 27 will be released and may be moved upwardly by its spring 22 and by the weight of the associated arm 14, 15 or 16. If, therefore, a signal has been given by the operation of a given lever and the operator desires to change the signal, it is merely necessary that he operate this signal which he desires shall appear, and this signal lever in moving to its operating position will release the operated signal lever and produce the change of signals desired. After a signal has been given and the indicated operation performed, the signal may be cleared by pressing upon the operating head 33, by which movement all of the latch members 31 are moved to the position in which their associated levers are released.

The electrically operated signal mechanism includes a casing 38 divided by partitions 39 and a plurality of compartments each having an illuminating element 40 therein. These compartments, in the present showing, are five in number and are designated as "right", "left", "stop", "slow", and "back". The illuminating element of the "back" compartment is operated by a switch 41, generally indicated as being operated from the reversing mechanism of the vehicle when the same is placed in operation. The "slow" compartment is operated from a switch 42, generally disclosed as being operated upon operation of the foot brake. I am aware that it is old to control the signalling elements of electrical signals from the reverse and brake mechanisms of the vehicle and accordingly I make no claim to the use of these elements except in combination as set forth.

The switch controlling the remaining compartments, or "right", "left", and "stop" compartments, of the electrical signalling element 38 is more clearly shown in Figure 2 and is located in the lower end of the casing 10. This switch comprises an insulating base 43 upon which are arranged a plurality of multiple circuit jack elements 44, 45 and 46. Each jack element 44, 45 and 46 includes an upper contact arm 47, and an intermediate contact arm 48, and a lower contact arm 49, the arms 47, 48 and 49 being separated at one end by insulation, as indicated, and being formed from the usual resilient material employed in the construction of jacks. These jack elements are secured to the base adjacent one end thereof, and the insulating base adjacent the opposite end has secured thereto a bus bar 50 over which the lower arms of the jack elements extend in spaced relation. This bus bar is provided with an upwardly extending portion 51 having an angularly bent extremity 52 overlying the upper arm 47 of the jack element 44 and against which this arm normally engages by reason of its resiliency. Overlying the upper arms 47 of the jack elements 45 and 46 is a connecting bar 53 against which the upper arms 47 of the jack elements 45 and 46 are normally engaged.

Each arm 47 of the jack elements 44, 45 and 46 is provided upon its under surface with an insulating striker 54 which prevents electrical contact of the arms 47 and 48 of any of the jack elements. As the arm 47 is forced downwardly, it first breaks its connection with either the member 52 or 53, then engages the arm 48 forcing this arm into engagement with the arm 49 to electrically connect the arms 48 and 49, and then finally forces the arm 49 into engagement with the bus bar 50. As above stated, a switch is located in the lower portion of the casing 10, and the switch is so positioned that it has its jack elements 44, 45 and 46 aligned with the levers 27, 26 and 25, respectively, of the mechanically operated signalling mechanism. Each lever 25, 26 and 27 has secured thereto a resilient jack operating member 55 having an insulating striker 56 which as the lever is moved downwardly comes into engagement with the arm 47 of the associated jack element and causes this arm to move downwardly causing the succession of operations in the jack element as above described. The connections employed for the electrical switches controlling the operation of the various compartments of the electrical signalling mechanism are as follows: From a source of current 57, one side of which is preferably grounded as indicated at 58, connection is made to the bus bar 50 by a wire 59 having arranged therein a switch 60. Between the switch and the bus bar a connection is made, as at 61, with one terminal of the switch 41, the opposite terminal of this switch being connected with one terminal of the illuminating element of the "back" compartment by a wire 62. It is pointed out that the illuminating elements of the signal compartments each have one terminal thereof connected with the ground where a grounded return is employed as indicated in the present instance. The arms 49 of the switches are connected in parallel with a wire 63 connected with one terminal of a pilot light 64, the second terminal of which is grounded. The elements 48 of the jack elements 44, 45 and 46 are connected with the ungrounded contacts of the illuminating elements 40 of the "right", "stop", and "left" compartments by wires 65, 66 and 67 respectively. The arms 47 of the jack elements 44 and 45 are connected in parallel by a wire 68, and the arm 47 of the jack element 46 is connected by a wire 69 with one contact of the switch 42, the second contact of which is connected with the ungrounded contact of the illuminating element 40 of the "slow" compartment by a wire 70. If desired, differently colored illuminating elements 71, 72 and 73 may be mounted upon the casing 10 as shown and connected with the wires 65, 66 and 67 respectively.

With the connections such as above described and that the operator desires to make a "right" turn, the operation is as follows: The lever 27 is forced downwardly to a position where it is held by the latching element associated therewith. As the lever is moved downwardly, the arm 16 is swung outwardly to a horizontal position and the striker 56 of the jack operating element 55 of the lever 27 comes into engagement with the arm 47 of the jack element 44. The arm 47 is forced downwardly, breaking its connection with the bus bar, through the element 52, engages with its insulated striking element 54 the arm 48 forcing this downwardly into engagement with the arm 49, and the arm 49 into engagement with the bus bar. The circuit is then as follows: from the battery through the bus bar to the arm 49, and through this arm 49 to the arm 48, from the arm 48 to the signal element 40 through wire 65, illuminating the "right" compartment and indicating a "right" turn in conjunction with the arm 16. At the same time, current passes through the arm 49 to wire 63 and the pilot light 64 is actuated, indicating to the driver that the signal is in operation. The turning movement having been completed, the arm is released by pressing the operating head 33 of the link 32 or by the operation of a second lever as above described. After the lever is released, the arms of the jack elements assume their normal position, the arm 47 coming into electrical engagement with the bus bar through the element 52.

It is pointed out that the circuit for the foot brake operated switch 42 is through the bus bar to the arm 47 of the jack element 44, wire 68, arm 47 of the jack element 45, connector 53, arm 47 of the jack element 46, and wire 69 to the switch 42. It will be obvious that if any of the levers is operated, since the first operation of the lever affecting the associated jacking element is to disengage its contact 47, if the foot brake be in use and the "slow" signal in operation at the time of giving of any signal, this "slow" signal will be disconnected, regardless of operation of the switch 42, at the time that either the "right", "left", or "stop" signal is given. While a corresponding arrangement of the switch 41 might be resorted to, it is pointed out that the reverse is seldom employed except in very low speeds and would be entirely unnecessary to give any signals of intention to turn during an operation in reverse and accordingly this has been eliminated. By use of the switch 60 all of the signal elements can be disconnected so that the mechanically operated switch is operated independently.

It will be obvious that the construction hereinbefore set forth is capable of a considerable range of change and modification without departing from the spirit of my invention and without altering the combination set forth. I do not, therefore, limit myself to such specific structure as hereinbefore set forth except as hereinafter claimed.

I claim:—

A signal control switch comprising a plurality of switch sections each embodying a contact element movable in one direction to open a circuit and a second contact element movable in the same direction to close a second circuit, the first named contacts of the sections being connected in series and an operating element for each section coacting with the contact elements of the section to simultaneously shift the same in said direction.

In testimony whereof I hereunto affix my signature.

NEWTON W. COFFEY.